March 18, 1969 M. L. BOOY ET AL 3,433,055

METHOD OF MEASURING METERING ACCURACY OF A SPINNERET

Filed Sept. 9, 1966

INVENTORS
MAX LORENZ BOOY
BENJAMIN FRANKLIN COE
STEPHEN CHARLES STUTLER

BY Howard P. West Jr

ATTORNEY

United States Patent Office 3,433,055
Patented Mar. 18, 1969

3,433,055
METHOD OF MEASURING METERING ACCURACY OF A SPINNERET
Max Lorenz Booy and Benjamin Franklin Coe, Wilmington, Del., and Stephen Charles Stutler, Collinsville, Va., assignors to E. I. du Pont de Nemours and Company, Wilmington, Del., a corporation of Delaware
Filed Sept. 9, 1966, Ser. No. 578,206
U.S. Cl. 73—37.5     3 Claims
Int. Cl. G01b *13/08*

ABSTRACT OF THE DISCLOSURE

A method of measuring metering accuracy of spinneret capillaries that includes the steps of sequentially positioning the capillaries of a spinneret plate under a valve supplied with pressurized liquid then injecting the liquid into the capillary. The back pressure due to the flow resistance of the capillary is measured and compared to the back pressure generated by a previously tested standard capillary to determine deviation in flow resistance of the hole and finally the liquid flow is interrupted at the valve to maintain the system under pressure for purging the next capillary to be tested.

---

This invention relates to spinnerets for the production of filaments and, more particularly, to a method for determining spinneret metering accuracy.

Spinneret capillaries in multihole spinnerets must meter viscous liquids within close tolerance limits when forming filaments to avoid interfilament denier variations that result in unacceptable yarn quality. In the manufacture of spinnerets it is highly desirable to be able to accurately and rapidly measure metering accuracy of each capillary as a percentage deviation in liquid flow resistance from a standard to determine whether the spinneret will produce filaments within the range of denier variation allowable for acceptable quality yarn.

There have been various methods proposed for determining capillary metering accuracy such as supplying a liquid at a fixed pressure to the capillary and measuring the flow rate by collecting a quantity of liquid in a unit time and then weighing it as disclosed by Levy in U.S. Patent 1,676,831. It has also been recognized by Hitchner in U.S. Patent 2,925,692 that the measurement of back pressure exerted due to the resistance to flow of air through a capillary is a means of obtaining metering accuracy. Air is not suitable for measuring the metering accuracy of spinneret capillaries because in the range of pressures that are useful for measuring flow resistance accurately the air flow is turbulent rather than having the laminar flow characteristics of molten polymers used in the spinning of filaments. The resultant measurements vary widely and as a consequence are not accurate enough for a determination of whether a spinneret will produce filaments within the range of denier variation required for acceptable yarn quality. Liquids having a viscosity of at least one poise are suitable for use in the pressure range that is useful for measuring metering accuracy of spinneret capillaries. However, no method exists whereby an accurate measure of liquid metering accuracy for capillaries can be obtained without weighing the flow as disclosed by Levy; and this method greatly influences the time required for, as well as the cost of, the measuring operation.

Accordingly, it is an object of this invention to provide a method whereby the liquid metering accuracy of a capillary can be obtained without weighing the flow of the testing liquid. Another object of this invention is to provide a method for rapidly determining the liquid flow resistance deviation from a standard for each capillary of a multihole spinneret by means of pressure maesurements.

These objects are accomplished by supplying a pressurized liquid to a valve, sequentially positioning the capillaries of a spinneret under the valve, then injecting the liquid into a capillary positioned below the valve and allowing the flow to reach equilibrium. The back pressure due to the flow resistance of the capillary is measured and compared to the back pressure generated by a previously tested standard capillary to determine the deviation in flow resistance of the hole, and finally the liquid flow is interrupted at the valve to maintain the system under pressure for purging the next capillary to be tested and prevent the loss of an excessive amount of oil between measurements.

For a better understanding of the invention and to show how it may be carried into effect, reference will now be made to the accompanying drawings in which.

Figure 1:
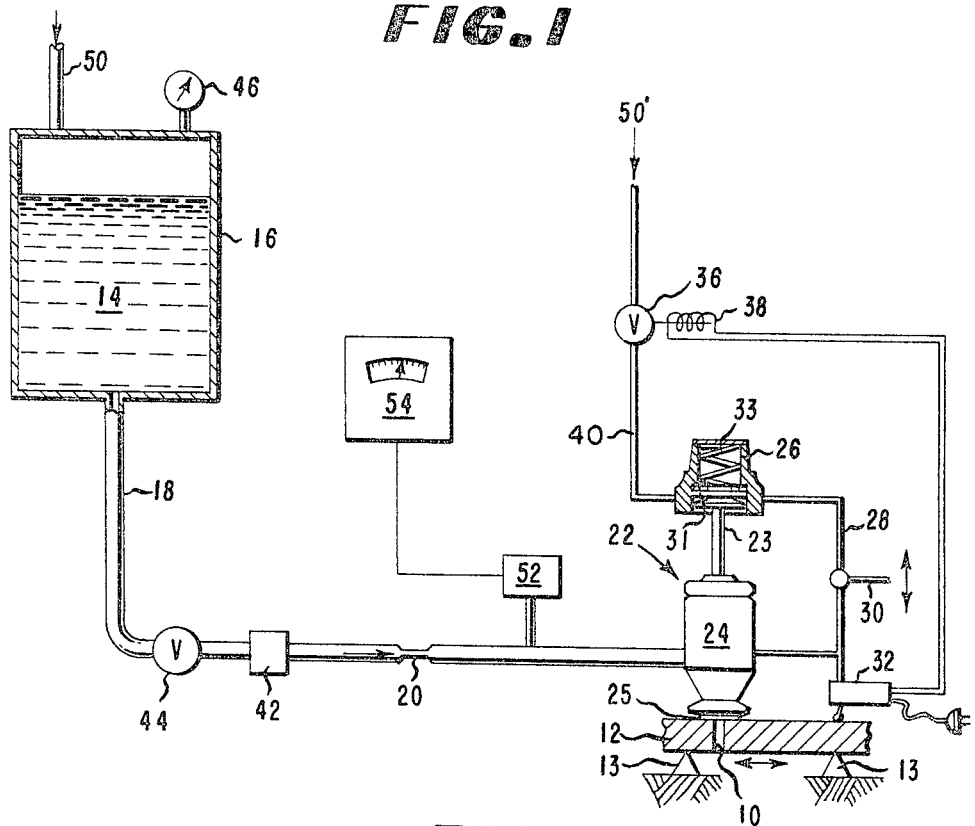
FIGURE 1 is a diagrammatic layout of the testing system.

Referring to FIGURE 1, the apparatus generally consists of a pipe line 18 connected between a pressurized tank 16 containing a fluid 14 and a valve 22 positioned to direct a stream of the fluid 14 through capillary 10 of spinneret 12 that is supported against downward movement by supports 13. Tank 16 is under a substantially constant pressure from a regulated gas or air supply 50, as indicated by gauge 46 on the tank. Line 18 has a cutoff valve 44 between the tank 16 and filter 42 which filters out foreign particles that would affect the accuracy of measurements made. The fluid after passage from the tank 16 through valve 44 and filter 42 passes through an orifice 20 with properly selected resistance to control flow rate then to valve 22 where the fluid is injected into capillary 10 then allowed to flow freely until system equilibrium is reached. A pressure transducer 52 is teed off line 18 between orifice 20 and valve 22. A transducer of the type manufactured by M.B. Electronics Co., as Model #151 DBA–1 has been found to be satisfactory for this application. The output of transducer 52 is connected to a computer 54 which compares transducer output to a standard and calculates the percent deviation in flow resistance from the standard. The computer provides a readout in percent deviation in flow resistance from the standard. Alternatively the computer could be used to calculate the mean deviation of all the holes in the spinneret from the standard then provide a readout for each hole in percent deviation in flow resistance from the mean deviation.

In a multihole spinneret, generally the first capillary tested is used as a reference standard. However, a separate calibrated capillary may be used as a reference standard. The magnitude of the reference standard does not have to be known when the flow resistances of a set of capillaries in a spinneret are compared. Assume that Z holes must be compared. Let $i$ be the index designating a typical capillary. Then the index $i$ can be used to represent any capillary in the spinneret, e.g. (1 . . . Z). Using the analogy to flow of DC current, the total system pressure can be represented as $$P_T = (R_i + R_o)QM \qquad (1)$$

where:

$R_i$ = The liquid flow resistance of the capillary being tested
$R_o$ = The sum of the liquid flow resistances of orifice 20 and valves and piping
$P_T$ = Tank pressure
$Q$ = Flow rate
$M$ = Fluid viscosity Let the index of the reference standard capillary be 1, then $R_i$ can be expressed as $$R_i = R_1(1 + \delta_i) \qquad (2)$$

where $\delta_i$ is the liquid flow resistance deviation of capillary $i$; then from (1) above $$P_T = QM(R_1 + R_o) \qquad (3)$$

A pressure $P_1$ will be measured at transducer 52 for reference capillary $R_1$ where $$P_1 = R_1 QM \qquad (4)$$

or from (3)

$$P_1 = P_T \left(\frac{R_1}{R_1 + R_o}\right) \qquad (5)$$

In tests of capillary $i$, a pressure $P_i$ will be measured at transducer 52 where $$P_i = P_T \left(\frac{R_i}{R_i + R_o}\right) \qquad (6)$$

or substituting from Equation 2

$$P_i = P_T \frac{R_1(1 + \delta)}{R_o + R_1(1 + \delta_i)} \qquad (7)$$

The ratio of the transducer pressures of the capillary being tested to the standard is $$\frac{P_i}{P_1} = \frac{1 + \delta_i}{1 + \delta_i \left(\frac{R_1}{R_1 + R_o}\right)} \qquad (8)$$

however from Equation 5

$$R_1/R_o + R_1 = P_1/P_T$$

then substituting in (8) and rearranging $$\delta_i = -\frac{1 - \dfrac{P_i}{P_1}}{1 - \dfrac{P_i}{P_T}} \qquad (9)$$

The above equations are based on having a substantially constant tank pressure; however, if the tank pressure $P_T$ varies from one hole measurement to the next the following relationship derived as in Equations 1–9 would apply $$\delta_i = -\frac{1 - \dfrac{P_i}{P_1} \dfrac{P_T}{P_{Ti}}}{1 - \dfrac{P_i}{P_{Ti}}} \qquad (10)$$

where $P_{Ti}$ is the tank pressure for testing capillary $i$.

As shown by the above equations, the deviation in flow resistance of a capillary is determined by comparing the back pressure due to the flow resistance of the capillary tested to the back pressure generated by a standard. The flow compensation term in the denominator of Equations 9 and 10 is the ratio of back pressure generated by the capillary being tested to the tank pressure. This ratio is not critical and a ratio within the range of from 1:2 to 1:15 is satisfactory for most applications. Orifice 20 is sized to provide this differential. Tank pressures used are generally in the range of from 40 to 100 p.s.i. The selection of the oil is based primarily on the criterion that the flow be substantially laminar in the range of pressures utilized and as previously discussed a light weight oil is suitable. In addition these oils should be of the type wherein their viscosity is fairly insensitive to temperature changes, e.g. glycol base or silicone oils.

The calculation for deviation presented above lends itself to analog or digital computer calculation and a numerical print-out can be achieved in terms of the desired variable, percent deviation in flow from a standard. An analog computer that would satisfactorily perform this calculation is the Model TR–10 manufactured by Electronics Associates.

Valve 22 consists of spring loaded air cylinder 26 and a valve body 24 held in spaced relationship by a yoke shown schematically as 28. Valve stem 23 is connected to piston 31 of the air cylinder. A Model 22AUH valve manufactured by the Spraying Systems Company is adaptable for this use. A gasket 25 is attached to valve body 24 to provide a seal between the valve body and spinneret 12, thus providing a passageway between the valve and the capillary being tested. Vertical movement can be transmitted to valve 22 through arm 30 attached to yoke 28. A solenoid valve 36 is in air supply line 40 between air cylinder 26 and air supply source 50' for intermittently supplying air to the cylinder. A control switch 32 is attached to yoke 28 and connected to a source of electricity and to the coil 38 of solenoid valve 36. Switch 32 is an on-off type of switch and is arranged so that contact with the spinneret 12 closes the switch and opens the solenoid valve 36 admitting air to the underside of piston 31 in cylinder 26 urging the piston and valve stem 23 upward. When switch 32 is not in contact with the spinneret plate, valve 36 is closed and spring 35 urges piston 31 and valve stem 23 downward.

Figure 2:
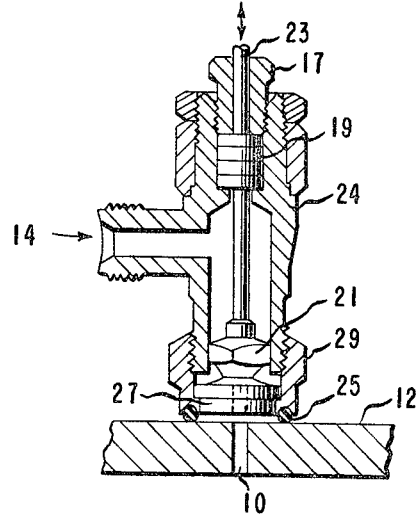
FIGURE 2 is an enlarged cross section of a portion of the cutoff valve employed to interrupt the fluid flow at the spinneret.

Referring now to FIGURE 2, valve body 24 includes the valve stem 23 extending coaxially through packing 19 and packing retainer nut 17 and terminating within the valve chamber. A valve seat 21, shown in the closed position, is attached to the end of the valve stem. An adapter 29 is threaded to the end of valve body 24 an serves to hold valve orifice 27 in position as well as a holder for ring gasket 25. Movement of valve stem 23 upward allows liquid 14 to flow through valve orifice 27 and out through capillary 10. Valve 22 is an important feature of the testing system in providing a fast measurement response. By means of valve 22, system pressure is maintained between measurements so that when the valve is opened a flow surge occurs from the energy stored in the system and the liquid is injected to rapidly remove air from the capillary being tested. Without valve 22 in the system, the time for the system to reach equilibrium during the test would be lengthened considerably. Comparative tests have shown that the time for measuring a capillary can be reduced from a 30–45 second period experienced without the valve in the system to very short periods of from 1–5 seconds when valve 22 is used in the system.

In operation, control switch 32 is closed by contacting spinneret 12 then solenoid valve 36 opens admitting air to cylinder 26. Piston 31 and valve stem 23 move upward opening valve 22. Liquid 14 which is contained in the testing system under pressure surges out orifice plate 27 and is injected through capillary 10 sweeping the air from the capillary. The back pressure exerted by fluid 14 due to the resistance to flow of capillary 10 is transduced to an electrical output by transducer 52. The signal from the transducer is compared to a reference standard in the computer 54 and read out as percent deviation from the standard. As the valve 22 is raised, so another capillary of spinneret 12 can be positioned under it for testing, microswitch 32 opens causing solenoid valve 36 to close. This cuts off the air to cylinder 26 and the action of spring 33 immediately closes valve seat 21 against valve orifice 27 interrupting the flow of liquid through valve 22. When the next capillary is positioned, valve 22 is lowered and the cycle is repeated.

Various modifications may be resorted to as, for example, the positioning of the spinneret under the test valve may be automated and incorporate a tape controlled table. The actuation of valve 22 could also serve as a convenient signal alert for computing equipment used. It is also apparent that other modifications may be made without departing from the spirit of the present invention.

What is claimed is:

1. The method of measuring the metering accuracy of a multihole plate by determining the deviation in liquid flow resistance from a standard for each hole of the plate, comprising the steps of:
 (a) sequentially postiioning the holes under a valve having an inlet and outlet;
 (b) supplying a pressurized liquid to the valve inlet;
 (c) moving the valve into engagement with the plate to complete a passageway between the hole being tested and the valve outlet;
 (d) simultaneously injecting the liquid into the hole to purge air from the hole;
 (e) allowing the liquid to flow through the hole until a state of equilibrium is reached:
 (f) measuring the back pressure of the liquid due to the liquid flow resistance of the hole;
 (g) comparing the back pressure to a standard pressure to determine the deviation in flow resistance of the hole from the standard; and
 (h) interrupting the liquid flow at the valve outlet and thereby maintaining system pressure and preventing the loss of liquid from the system between hole measurements.

2. The method of claim 1 wherein the liquid is oil having a viscosity of at least one poise.

3. The method of claim 1 wherein the liquid is a silicone oil.

References Cited

UNITED STATES PATENTS

| 2,779,188 | 1/1957 | Meyer | 73—37.8 |
| 3,150,442 | 9/1964 | Straw et al. | 73—37.5 |
| 3,271,994 | 9/1966 | Fournier et al. | 73—3 |

LOUIS R. PRINCE, *Primary Examiner.*

WILLIAM HENRY, *Assistant Examiner.*

U.S. Cl. X.R.

322—80; 318—29; 324—20